Figure 1:
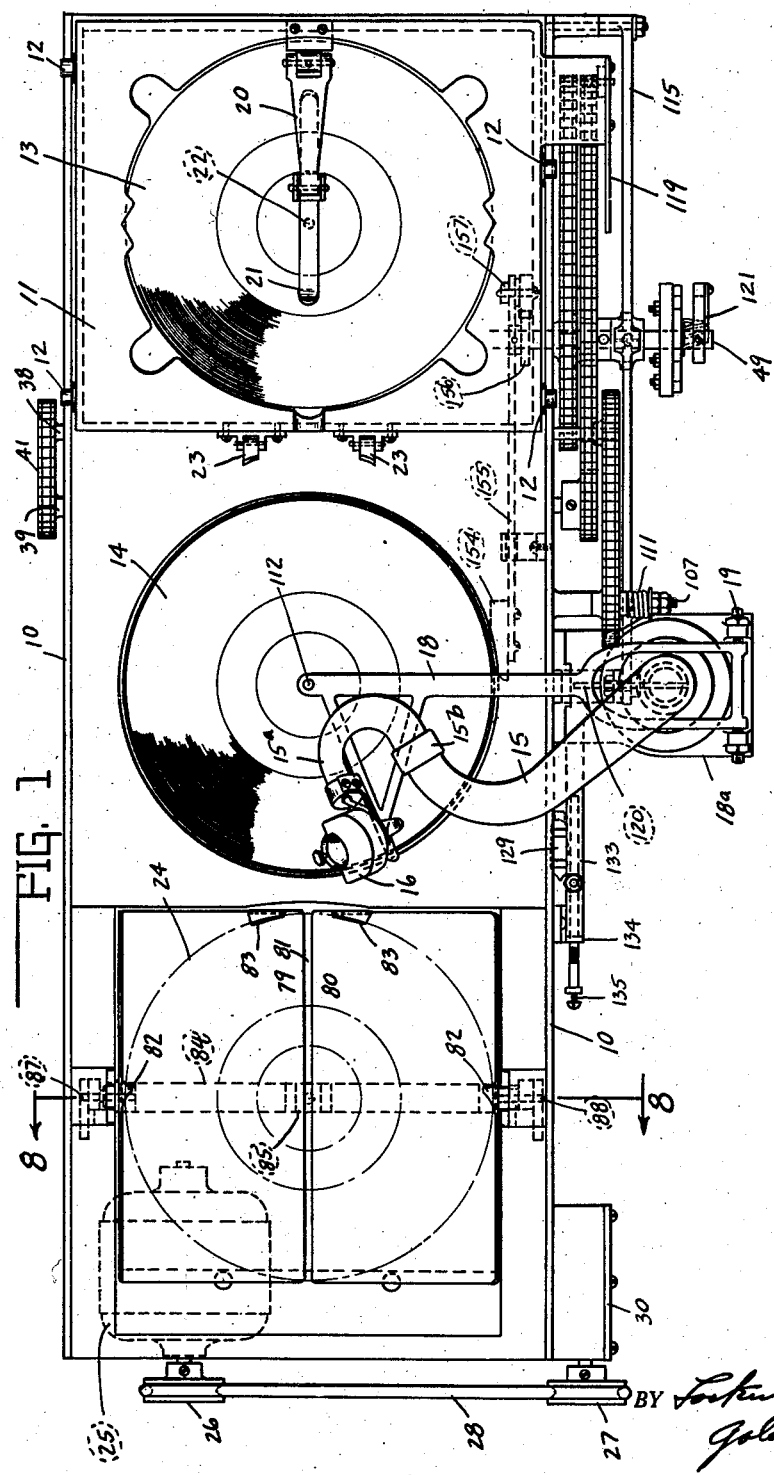

Aug. 23, 1932.  T. W. SMALL  1,872,835
AUTOMATIC PHONOGRAPH
Filed May 17, 1929  6 Sheets-Sheet 1

INVENTOR.
THOMAS W. SMALL.
BY
ATTORNEYS.

Aug. 23, 1932.  T. W. SMALL  1,872,835
AUTOMATIC PHONOGRAPH
Filed May 17, 1929   6 Sheets-Sheet 3

INVENTOR.
THOMAS W. SMALL.
BY
ATTORNEYS.

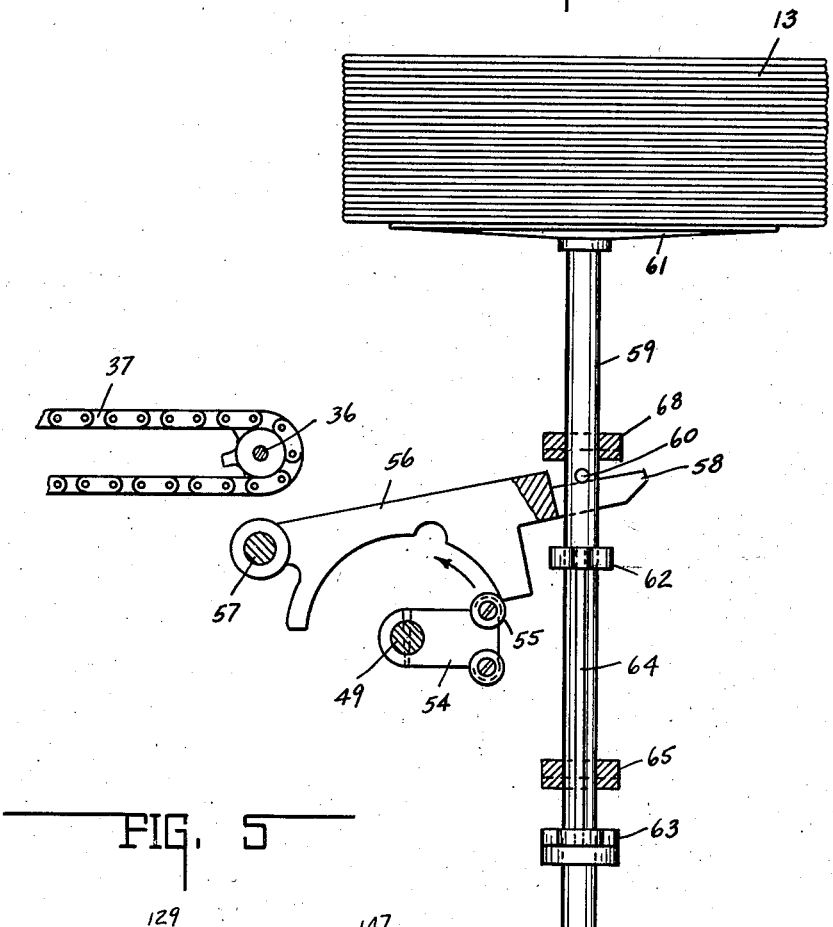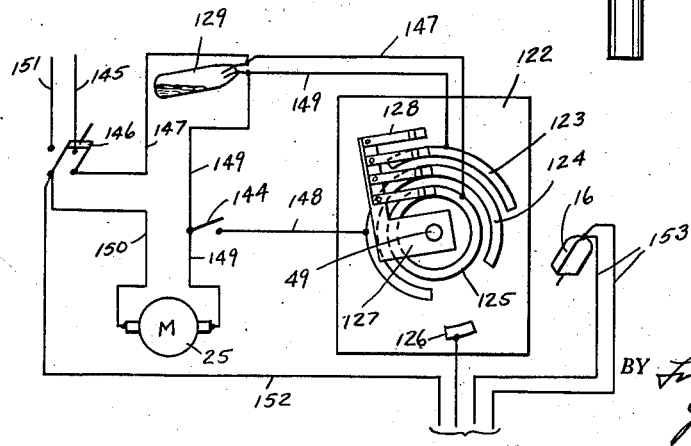

Aug. 23, 1932.  T. W. SMALL  1,872,835
AUTOMATIC PHONOGRAPH
Filed May 17, 1929  6 Sheets-Sheet 5
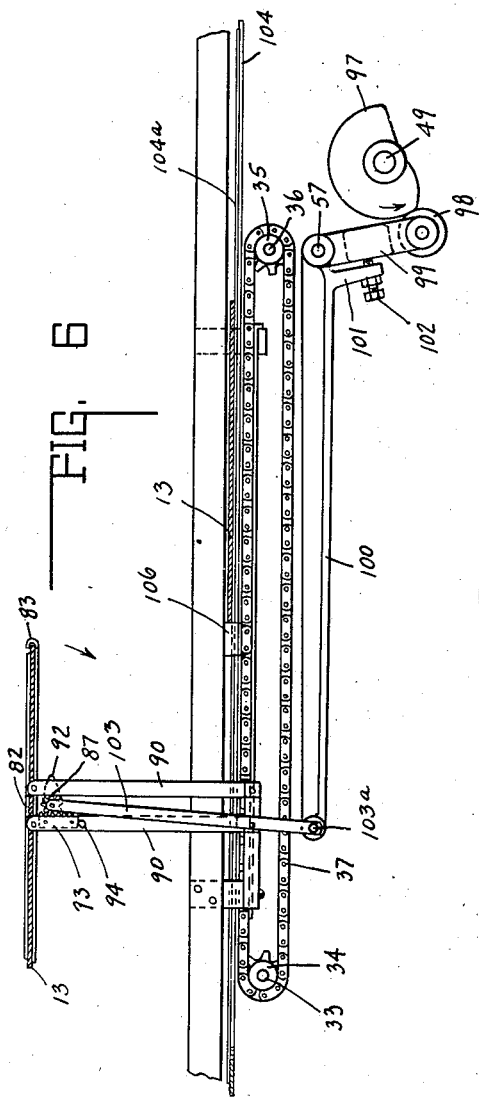
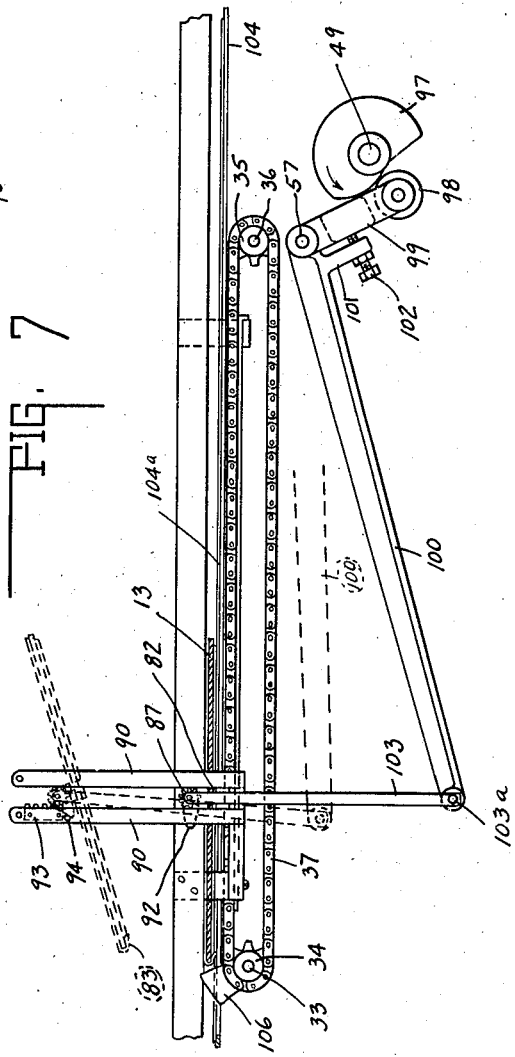
INVENTOR.
THOMAS W. SMALL.
BY
ATTORNEYS.

Aug. 23, 1932.  T. W. SMALL  1,872,835
AUTOMATIC PHONOGRAPH
Filed May 17, 1929  6 Sheets-Sheet 6

INVENTOR.
THOMAS W. SMALL.
BY
ATTORNEYS.

Patented Aug. 23, 1932

1,872,835

UNITED STATES PATENT OFFICE

THOMAS W. SMALL, OF HUNTINGTON, INDIANA, ASSIGNOR, BY MESNE ASSIGNMENTS, TO THE CAPEHART CORPORATION, OF FORT WAYNE, INDIANA, A CORPORATION OF INDIANA

AUTOMATIC PHONOGRAPH

Application filed May 17, 1929. Serial No. 363,776.

This invention relates to improvements in automatic phonographs such as disclosed in my prior applications, Serial No. 209,241, filed July 29, 1927; Patent No. 1,792,553, issued February 17, 1931 and Serial No. 330,379, filed January 4, 1929. In my earlier machines and in the present machine, I have developed an automatic phonograph which successively plays a plurality of disc records. The present machine is similar to the earlier machines in that it includes a magazine for storing a number of such records in superposed relation, apparatus for moving the topmost record from the magazine to a turn table for playing, mechanism for removing the records from the turn table, reversing them and lowering them to a plane below the turn table, and other mechanism for automatically returning them to the bottom of the stack of records in the magazine. Due to the reversal of the record, the two sides of the record are played alternately.

The object of the present invention is to affect substantial and material improvements over that disclosed in my prior applications above referred to, particularly in respect to the following features.

One feature of this invention resides in the provision of a novel form of mechanism for reversing and lowering the records after playing whereby this operation may be performed at a greater speed than heretofore without damage to the records.

Another feature resides in the provision of convenient means for adjusting the receiving position of the said lowering and reversing means.

Another feature resides in the provision of a new operating means for the elevator used to return records to the storage magazine and to support the records therein.

Another feature resides in a novel means of operating temporary supports for supporting the records in the magazine during the lowering and raising of the said elevator whereby the operation of said temporary supports may be more accurately timed with the operation of said elevator.

Another feature resides in the electrical arrangement wherein a control switch is provided for stopping and starting the machine, said switch being so connected that when the switch is operated to stop the machine during the playing of a record, the playing of the record will be completed, the record removed and a succeeding record placed in position for playing before the machine stops. Similarly, if the switch is operated to stop the machine during the changing of records, the change will be completed before the machine stops. By this arrangement, the machine, when stopped, is automatically left in condition to immediately start the playing of a new record when the switch is again actuated to start the machine.

Another feature of the invention resides in a simplified driving mechanism wherein the usual train of gears, actuating levers and shafts are eliminated and the mechanism is driven directly through the record returning carrier. This eliminates the interconnecting driving mechanism extending the full length of the machine for which is substituted merely the record returning carrier consisting of a sprocket chain with suitable record engaging members thereon.

A further feature of the invention resides in the pivotal mounting of the record centering arm in such manner as to cause it to raise and lower the center pin in a more perpendicular plane.

Other objects and features of the invention and the full nature thereof will be apparent from the accompanying drawings and the following specification and claims.

Figure 2:
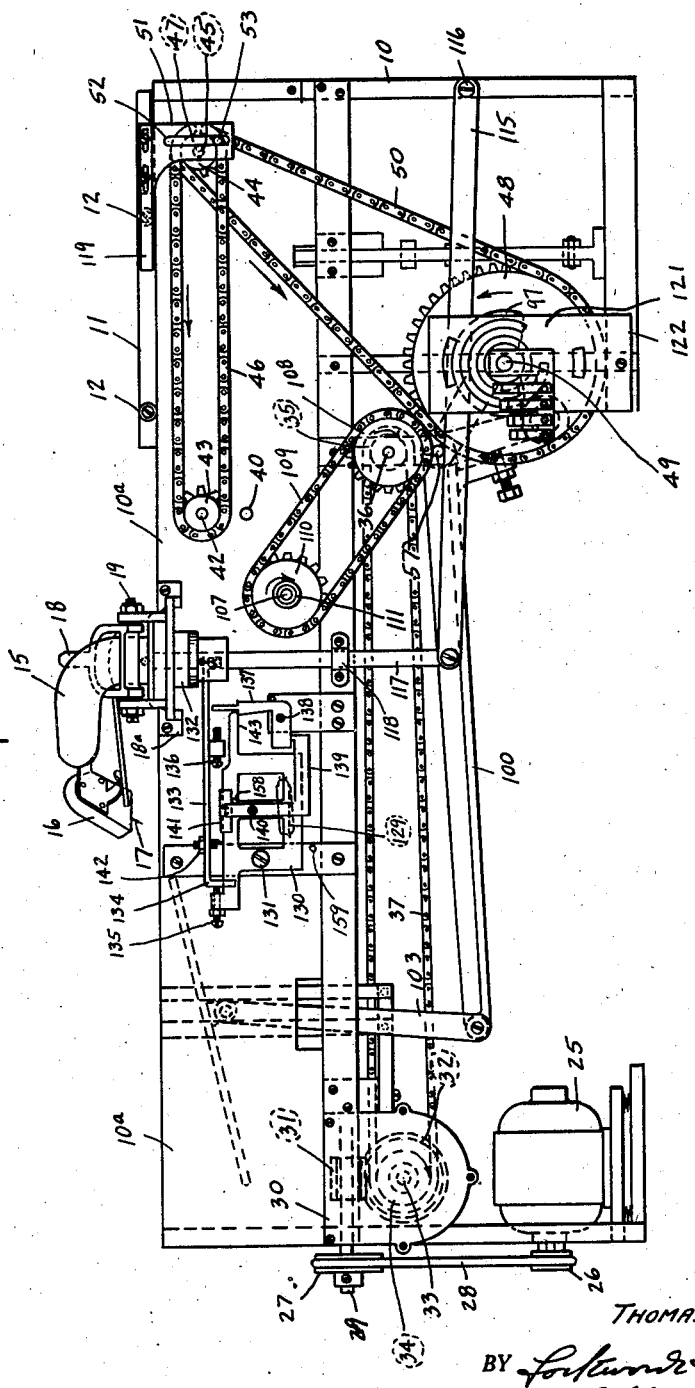
Figure 3:
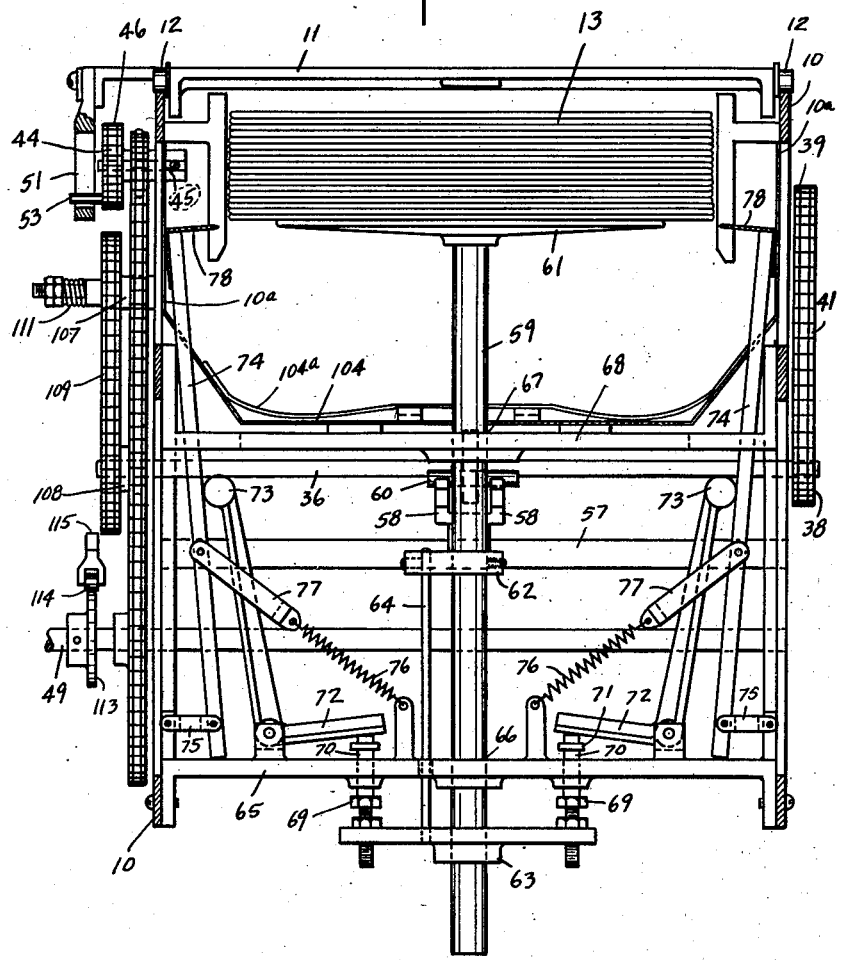
Figure 8:
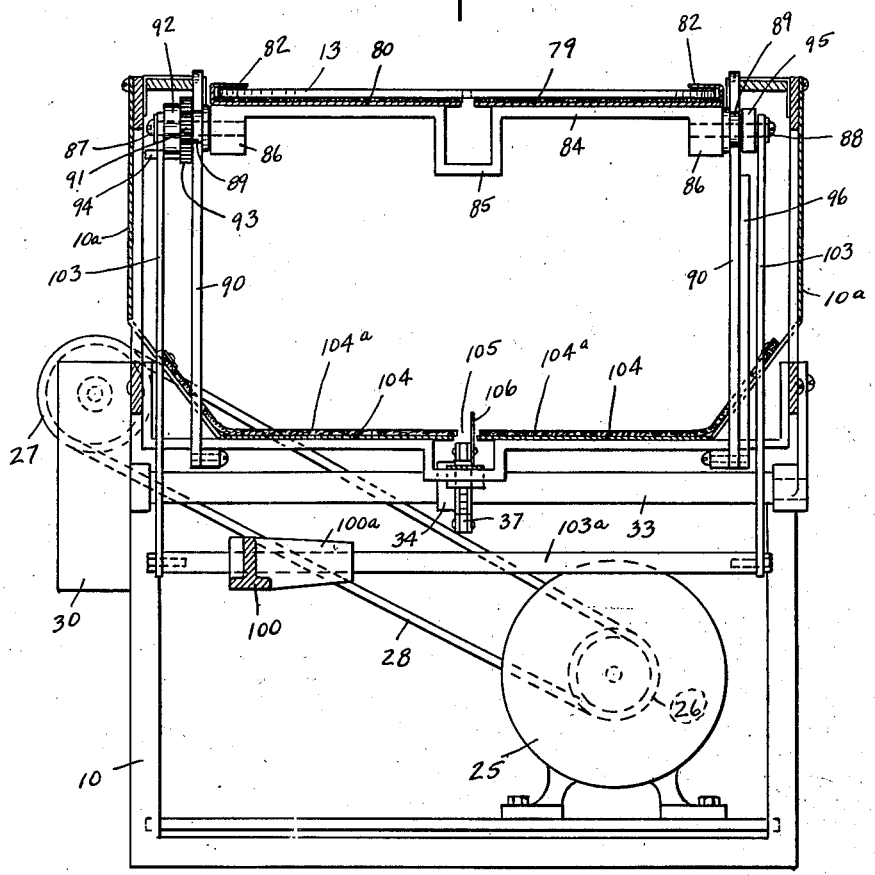

Fig. 1 is a top plan view showing the relative positions of the storage magazine, the turn table and the lowering and reversing mechanism. Fig. 2 is an elevational view showing the mechanism used for actuating the several motions of the machine. Fig. 3 is an elevational view of the storage magazine with parts removed. Fig. 4 is an elevational view of a portion of the operating mechanism for the said storage magazine with parts removed. Fig. 5 is a wiring diagram showing the connections of electrical apparatus for operating and controlling the machine. Fig. 6 is an elevational view, with parts removed, of the lowering and reversing mechanism showing the arrangement of parts for actuating the same. Fig. 7 is a similar view of the mechanism shown in a different position with a third position shown in dotted lines. Fig. 8 is a sectional view of the same mechanism taken on the line 8—8 of Fig. 1.

Referring to the drawings, the several parts of the machine are assembled upon a frame work indicated generally by the numeral 10. Side plates 10ª are attached to said frame work and enclose a portion of the machine.

Supported on a part of the frame work 10 is an electric motor 25 carrying a pulley 26 and driving a pulley 27 through belt 28. The pulley 27 is mounted on a shaft 29 supported in a worm gear housing 30 and carrying the worm 31. The worm 31 meshes with a worm wheel 32 carried upon a shaft 33 extending laterally through the machine and supported on suitable bearings attached to said frame work 10. The shaft 33 carries a sprocket 34 and a similar sprocket 35 is carried on a shaft 36 and driven from said sprocket 34 by a chain 37. The shaft 36 carries a second sprocket 38 and a similar sprocket 39 is carried upon a shaft 40 and driven from said sprocket 38 by a link chain 41. The shaft 40 is geared to a shaft 42 by a pair of spur gears not shown. Shaft 42 carries a sprocket 43 and a similar sprocket 44 is carried on a shaft 45 and driven from the sprocket 43 by a link chain 46. The shaft 45 also carries a sprocket 47 and a larger sprocket 48 is carried on a shaft 49 and driven from the sprocket 47 by a chain 50. The shafts 36, 40, 42, 45 and 49 are supported in suitable bearings carried on portions of the frame. By this mechanism each of the shafts and chains is driven at the proper speed to transmit the desired motions to the various parts of the apparatus in timed relation. The chain 37 is used for returning the records from the reversing and lowering means as well as for power drive of the remainder of the mechanism, thereby greatly simplifying the driving apparatus.

A carriage 11 is supported on rollers 12 on the upper portion of the frame 10. The carriage has a downwardly-extending portion 51 having a slotted opening 52 therein. A pin 53 carried on one of the links of chain 46 engages in the opening 52 and thereby causes reciprocating motion of the carriage upon the frame work 10 when the said chain is moved.

In Figs. 1 and 2 the carriage 11 is shown positioned over a storage magazine having a group of disc records 13 stored therein. Adjacent to the storage magazine is a turn table 14 which is driven by a conventional type of spring motor positioned therebeneath and not shown in the drawings. The winding shaft 107 of the spring motor is driven from the shaft 36 by means of a sprocket 108, a chain 109, a sprocket 110 and a friction clutch 111. Thus the motor is kept continually wound through the operation of the moving parts of the machine and protected from overwinding by the friction clutch. A brake shoe 154 is positioned adjacent to the edge of the turn table and is actuated for braking the turn table by the rod 155, lever 156 and a cam 157 carried on the shaft 49.

Pivotally carried on the carriage 11 is an arm 20 carrying a member 21 pivotally mounted on its outer end. The member 21 carries a lug 22 on its undersurface adapted to contact with the hole in the center of the uppermost of the records 13 carried in the magazine. Pivotally carried on the edge of the carriage 11 is a pair of lugs 23. In the motion of the carriage 11 to the left, referring to Fig. 1, the lug 22 engages the central hole in the uppermost record, removes that record from the storage magazine and slides it into position upon the turn table ready for playing. The lugs 23 contact with the edge of the record previously played sliding it from the turn table and placing it upon a lowering and reversing platform 24. The lug 23 is shaped with a bevel portion on its rearward edge which causes it to slip out of the central hole of the record when the carriage is returned thus leaving the record in position on the turn table. In the return of the carriage 11, the pivotal mounting of the lugs 23 permits the said lugs to slide over the record just placed on the return table.

A tone arm 15 is pivotally supported on a bracket 18ª secured to a part of the frame 10 and carries a goose neck portion 15ª free for rotation at 15ᵇ about a horizontal axis. The goose neck portion 15ª carries a telephonic transmitter unit 16 actuated by a needle 17 adapted to contact with a record carried on the turn table. The portion 15ª is supported when not in playing position by a portion of a lever 18 pivotally mounted on the bracket 18ª at point 19. The lever 18 carries at its outer end a downwardly-projecting centering pin 112 having a point adapted to engage the central hole in the record upon the turn table and a corresponding hole in the turn table itself. The pivot point 19 is placed at the extreme edge of the bracket 18ª farthest from the record. This gives to the lever 18 as long a leverage as possible and insures practically straight line movement of the centering pin 112 in entering the record hole.

A cam 113 is carried on the shaft 49 and engages a roller 114 carried on a lever 115. The lever 115 is pivoted at 116 to an upright member of the frame 10 and is pivotally connected at its opposite end to a vertical member 117. The member 117 is guided by a suitable member 118 carried on a portion of the frame 10 and contacts at its upper end with lever 18. By this mechanism the rotation of shaft 49 causes a vertical reciprocating motion of the member 117 to raise and lower the lever 18. The timing and extent of this motion is controlled by the shape and position of the cam 113. During the changing of records, as previously described, the lever 18 is elevated to support the transmitter unit 16 and the centering pin 112 above the plane of the record. When the record is in place on the turn table, the lever 18 is lowered bringing centering pin 112 into engagement with the hole in the record and bringing the needle 17 into contact with the upper surface of the record.

Supported upon a portion of the carriage 11 is an adjustable member 119 adapted to contact with a pin 120 carried on the tone arm 15. During the changing of records, this contact positions the tone arm with the needle 17 over the outer edge of the record in position for the start of playing. Adjustment of position is obtained by adjusting the position of the member 119.

Referring particularly to Figs. 3 and 4 showing the storage magazine and associated apparatus, the shaft 49 carries a member 54 upon which are pivotally mounted a pair of rollers 55. The rollers 55 engage the undersurface of a member 56 shaped substantially in a circular arc. The member 56 is pivotally mounted on a stationary shaft 57 and at its opposite end carries fork projections 58 adapted to straddle a vertical rod 59 and contact with pins 60 carried thereon for raising and lowering said rod. The rod 59 carries at its upper end a platform 61 adapted to support the pile of records 13. Fixedly carried on the rod 59 are collars 62 and 63 carrying between them a rod 64. The rod 64 passes through a cross member 65 of the frame work 10 and thereby prevents rotation of the rod 59. The rod 59 is guided in bearing 66 in the member 65 and bearing 67 in a similar member 68. By this construction, rotation of shaft 49 in the direction shown by the arrow in Fig. 4 causes alternate raising and lowering of the platform 61. Due to the semi-circular shape of the underside of the member 56 the platform 61 will remain in its uppermost position during the major part of the rotation of shaft 49.

Carried on the collar 63 is a pair of adjustable screws 69 each contacting with the lower end of a pin 70 extending through openings in the member 65. Each of the pins 70 carries a shoulder 71 adapted to contact with the member 65 to limit the travel of the said pin when the platform 61 is lowered to break the contact between the screws 69 and the lower ends of the stems 70. The upper end of each stem 70 contacts with one arm of a bell crank 72 pivotally mounted upon the member 65. The opposite arm of each of said bell cranks terminates in a rounded portion 73 contacting with a member 74.

Each member 74 is pivotally connected at its lower end to a link 75 and is supported upon the member 65. The links 75 are pivotally attached at their opposite ends to portions of the frame 10. A helical tension spring 76 is attached to each of the members 74 by means of a yoke 77. The opposite end of each spring is attached to a portion of member 65. Each member 74 carries at its upper end a member 78 adapted to move by the rotation of members 74 about their pivot points into position underneath the pile of records at a level slightly below the uppermost level of the platform 61. By this motion, the downward travel of the rod 59 breaks the contact between the screws 69 and the pins 70 allowing the action of the tension spring 76 to move the members 78 into position beneath the pile of records and support the same during the continued downward travel of the platform 61. At the end of the downward travel a record is placed upon the platform 61 in a manner to be hereinafter described. The platform is again raised, bringing screws 69 into contact with pins 70, thereby actuating the bell cranks 72 and the levers 74 to remove the members 78 from their record-supporting position. By adjustment of the screws 69 the removal of the members 78 is timed to occur simultaneously with the arrival of the platform 61 and the record thereon at the level occupied by said members 78.

The lowering and reversing platform 24 comprises two sections 79 and 80 having a space 81 therebetween. The sections 79 and 80 each carry an upturned and inbent portion 82 and a similar portion 83 positioned as shown in Fig. 1. Each of these portions is spaced above the level of the platform 24 sufficiently to allow the passage of a disc record therebeneath. In the removal of a record from the playing turn table to the platform 24, the record slides over the portions 83 and beneath the portions 82. Thereafter a downward tilting of the edge of the platform containing the portions 83 causes the record to slide beneath said portions and to be retained thereby during continued tilting and reversal of the platform. The platform sections 79 and 80 are mounted upon a cross member 84 having a U-shaped portion 85 spanning the opening 81 between said sections. The cross member 84 terminates at each end in a downwardly-curved portion 86 in one of which is fixedly mounted a pin 87 and in the other a pin 88. The pins 87 and 88 each carry a roller 89 guided between upright members 90 carried upon portions of the frame work 10. The pin 87 carries a pinion 91 and a member 92 fixedly attached thereto. The pinion 91 is adapted to engage with a rack 93 carried upon the upper end of one of the members 90. The member 92 is adapted to engage a pin 94 carried in the same member 90 and by such engagement automatically positions the platform in its upward travel so that the teeth of pinion 91 will engage the teeth of rack 93.

The raising and lowering of the platform is accomplished by means of a cam 97 carried on the shaft 49 and engaging a roller 98 carried on a link member 99, in turn rotatably mounted on the stationary shaft 57. A lever 100 is also rotatably mounted on the shaft 57 and carries a downwardly-extending portion 101 in turn carrying an adjusting screw 102 contacting with a portion of the link 99. The lever 100 terminates in a bearing portion 100$^a$ supporting a rod 103$^a$ extending transversely of the machine. A rod 103 is pivotally mounted at each end of the rod 103$^a$. The opposite ends of the rods 103 are pivotally connected to the pins 87 and 88 respectively. By this means rotation of the shaft 49 through a single revolution causes an alternate lowering and raising of the platform 24. The timing of the motion is controlled by the shape and position of the cam 97 and the upper limiting position of the platform is adjusted by means of the adjusting screw 102. The engagement of the screw 102 and the link 99 is maintained by the weight of the platform and associated apparatus. Therefore, when the platform is lowered to rest upon members to be hereinafter described at the lowermost limit of its travel, this engagement is broken.

Starting from the position shown in Fig. 6 the lowering of the platform causes rotation thereof about the pins 87 and 88 in the direction shown by the arrow due to the engagement of the pinion 91 and the rack 93. The said rotation is completed before the pinion 91 is disengaged from the rack 93 and thereafter a rectangular block 95 which is fixedly carried on the pin 88 engages a projecting portion 96 on one of the members 90 thereby preventing further rotation of the platform about the pins 87 and 88. In the raising of the platform rotation thereof is prevented by the engagement of block 95 with projecting portion 96 until the top of said projecting position is reached. Thereafter the return rotation is initiated by the contact of member 92 with pin 94 automatically bringing pinion 91 and rack 93 into engagement to complete the rotation. During the lowering and reversing the record 13 is securely held by the members 82 and 83. It has been found that with this mechanism movement may be accomplished in a much shorter time without damage than with the mechanism heretofore used.

Supported upon a part of the frame work 10 is a platform 104 positioned above the chain 37 and having a central aperture 105 extending the full length thereof. One end of the said platform is positioned beneath the platform 25 and the opposite end is positioned adjacent to the lowermost position of the platform 61 used for elevating records to the storage magazine. The upper surface of the platform 104 is covered with felt 104$^a$ or other suitable material for preventing damage to records thereon. The chain 37 carries an attachment 106 extending within the aperture 105. After the lowering of the platform 24 the said platform comes to rest with the record carried thereon resting upon the platform 104. With the record in this position, the travel of the chain 37 brings the attachment 106 through the aperture 105 and the space 81. The attachment 106 comes in contact with the record and sliding it along the surface of the platform 104 delivers it to the platform 61 to be again placed in position as the lowermost record in the storage magazine.

A master switch used for the principal electrical control means is indicated generally by the numeral 121. In this switch construction an insulation panel 122 is attached to a portion of the frame work 10 and carries a series of arcuate contact members 123, 124, 125 and 126. The shaft 49 extends through the insulation piece 122 and carries an insulation arm 127 fixedly attached thereto. Spring contact members 128 are carried on the arm 127 and are adapted to contact with the contact members 123, 124, 125 and 126. The members 128 are electrically connected together.

A mercury switch 129 is carried upon a frame 130 pivotally mounted at 131 upon a portion of the frame work 10. A portion 132 of the tone arm 15 extends through its supporting bracket 18$^a$ and has attached thereto a rod 133. The rod 133 has a downwardly-projecting portion 134 positioned to contact with an adjustable screw 135 carried on a portion of the frame 130. An adjusting screw 136 is carried on the lower side of the rod 133 and is adapted to contact with the upper end of a trigger member 137 pivotally mounted at 138 to a portion of the frame work 10. A second trigger member 139 is adapted to engage a portion of the trigger member 137 and is pivotally mounted at 140 to the frame 130. A pin 158 limits the travel of the trigger member 139 in one direction. The member 139 carries at its upper end a member 141 having a serrated upper edge. A screw 142 is carried on the rod 133 and has a knife edge at its lower end contacting with the serrated edge of member 141.

In the operation of the mercury switch the rod 133 is reciprocated by the motion of the tone arm. When the tone arm is moved toward the left, as shown in Fig. 2 to the position for starting the playing of a record, the portion 134 of the rod 133 engages the adjusting screw 135 tilting the frame 130 and the mercury switch carried thereon into the non-contacting position. In this position a projecting portion 143 of the frame 130 engages a shoulder on the trigger member 137 thereby maintaining the switch in the non-contacting position. In the playing of the record, the tone arm is moved toward the center of the record and at the end of the playing the needle is carried into a braking groove carried on the record. Two types of braking grooves are in common use. In one of these the needle is carried into a groove concentric with the playing grooves of the record and relatively close to the center. In the second type the needle is carried into an eccentric groove resulting in an oscillation of the tone arm. If the first type of record is being played, the movement of the needle into the braking groove brings the adjusting screw 136 into contact with the upper end of the trigger member 137 thereby allowing the frame 130 and the mercury switch 129 carried thereby to drop into the contacting position. If the second type of record is being played, the oscillation of the tone arm takes place when the end of the screw 142 is in contact with the serrated member 141. The pin 158 prevents movement of member 141 as long as the tone arm moves to the right. The reverse motion of the screw 142, due to the oscillation of the tone arm, however imparts motion to the trigger member 139 and in turn trips the trigger 137 thereby dropping the mercury switch into the contacting position. In the operation of the mercury switch pin 159 limits the travel of frame 130 when dropped into contacting position. By this mechanism, therefore, the contact in the mercury switch is made at the finish of the playing of each record and is broken when a new record has been placed in position for playing.

Fig. 5 represents the wiring diagram for controlling the changing of records. After the machine has been stopped the master switch 121 is so positioned that contact members 125 and 124 are in contact with their corresponding contact members 128. In this position there is no contact between members 123 and 126 and their corresponding contact members 128. The mercury switch 129 is in the non-contacting position. The needle 17 and the pin 112 are in the upraised position out of contact with the record and the needle 17 is positioned above the starting point of the record. The carriage 11 has not completed its return travel and the platform 61 is in its uppermost position supporting the records in the magazine. A record is in place on the turn table ready for playing and the record previously played is in place on the lowering and reversing platform 24. The brake shoe 154 is in position to prevent rotation of the turn table. With the mechanism in this position, a snap switch 144 is closed setting up a circuit to start the motor 25 as follows:

From the main supply line 145 through one side of a double pole knife switch 146 through a line 147 to the common contact member 125, through the contact members 128, the contact member 124 and a line 148 to the snap switch 144, through line 149 to the motor 25 and thence through a line 150 to the opposite terminal of the double pole knife switch 146 and the opposite supply line 151.

With the starting of the motor, the following events are simultaneously initiated:

First, the return of the carriage 11 to its position over the storage magazine. Second, the lowering and reversal of the platform 24 and the record carried thereon. Third, the lowering of the lever 18 bringing the pin 112 into the central hole of the record and bringing the needle 17 into contact with the record for playing. Fourth, the lowering of the platform 61 to receive a record placed thereon from the platform 104 and the raising of the said platform and the record carried thereon to again support the records in the storage magazine. Fifth, the brake mechanism is actuated to start the turn table. All of these motions take place during the time that the arm 127 of the master switch 121 is rotated to the position where contact is broken between contact member 124 and its corresponding member 128. When the switch reaches that position the motor stops and contact is made by the contact member 126 and its corresponding member 128. The 126—128 contact closes a circuit to a conventional form of electrical amplifier used for reproducing the music recorded on the records and not shown in the drawings. The circuit so set up is as follows: from supply line 145, switch 146, line 147, contact member 125, contact members 128, contact member 126 to the amplifier. From the amplifier on line 152 to switch 145 and supply line 151. The telephonic transmitter unit 16 is connected by a pair of lines 153 with the input terminals of the amplifier.

This position of parts is maintained during the playing of the record, at the end of which time the mercury switch 129 is actuated to close its circuit as previously described. This actuation again starts the motor through the circuit 145—146—147—129—149—25—150—146—151. With the starting of the motor the following events are simultaneously initiated: First, the lever 18 is lifted removing the pin 112 from the hole in the record and removing the needle 17 from contact with the record. Second, the brake is actuated to stop the rotation of the turn table. Third, the carriage 11 is actuated to remove the record from the turn table to the platform 24 and to bring a record from the storage magazine to the turn table. Fifth, the master switch arm 127 is rotated to break the 126—128 contact thereby preventing any of the sounds produced during the motion of the motor from being reproduced by the amplifier.

During the early part of the travel of the motor, contact is made between members 128 and 123. This contact is in parallel with the mercury switch, therefore, the movement of the mercury switch into the non-contacting position will not stop the motor. There will, therefore, be no arcing across the points of the mercury switch when contact is broken therein. The motor will continue to operate after the breaking of the mercury contact as long as the 123—128 contact is maintained.

If the snap switch 144 has remained closed during the playing and changing of a record, the shaft 49 makes a complete revolution thereby completing all of the movements of the machine as previously described. Records are then successively played so long as the snap switch 144 is closed. If the snap switch is opened during the playing of a record, the completion of the playing starts the motor by means of the mercury switch as previously described. The motor will continue to operate until the contact 123—128 is broken at some time after the breaking of the contact in the mercury switch. The 123—128 contact is not broken until a new record has been placed in position for playing and all of the parts are in the initial condition previously described. If the snap switch 144 is opened during the changing of a record, the motor will also continue to operate until the 123—128 contact is broken. Thus the opening of the snap switch is not immediately effective to stop the motor if a change of records is not complete. By this means the machine is left in position to start playing in the shortest possible time after the next actuation of the snap switch.

The switch 144 is here described as a "snap" switch but it is to be understood that any convenient form of electrical contactor, such as a coin controlled switch, may be used.

The invention claimed is:

1. In a repeating phonograph having a storage magazine, a vertically fixed horizontal turn table and a conveyor adapted to return records to said storage magazine, the combination of a lowering and reversing platform, mechanism for moving a record from said turn table to said platform, mechanism adapted to lower said platform and to reverse the same to place the record on the said conveyor in reversed relation, and members adapted to maintain the record on said platform during the said lowering and reversing.

2. In a repeating phonograph having a storage magazine, a vertically fixed horizontal turn table and a conveyor adapted to return records to said storage magazine, the combination of a reversing platform, mechanism for sliding a record horizontally from said turn table to said platform, mechanism adapted to lower said platform and to reverse the same to place the record on the said conveyor in reversed relation, and members carried on said platform adapted to maintain the record thereon during the said lowering and reversing.

3. In a repeating phonograph having a storage magazine, a vertically fixed horizontal turn table and a conveyor adapted to return records to said storage magazine, the combination of a reversing platform, mechanism for moving a record from said turn table to said platform, mechanism adapted to lower said platform and to reverse the same to place the record carried thereon on the said conveyor in reversed relation, said platform having a plurality of upturned and inbent portions adapted to receive the record therebeneath and to retain the record on said platform during the said lowering and reversing.

4. In a repeating phonograph having a storage magazine, a playing turn table and a conveyor adapted to return records to said storage magazine, the combination of a reversing platform, mechanism for moving a record from said turn table to said platform, mechanism adapted to lower said platform and to reverse the same to place the record on the said conveyor in reversed relation, and members spaced apart from said platform to receive the record therebeneath and maintain the record on said platform during the said lowering and reversing.

5. In a repeating phonograph having a storage magazine, a playing turn table and a conveyor adapted to return records to said storage magazine, the combination of a reversing platform, mechanism for moving a record from said turn table to said platform, mechanism adapted to lower said platform and to reverse the same to place the record on the said conveyor in reversed relation, and members spaced apart from said platform to receive the record therebeneath in its motion from said turn table to said platform for retaining the said record on said platform during the lowering and reversing.

6. In a repeating phonograph having a storage magazine, a playing turn table and a conveyor adapted to return records to said storage magazine, the combination of a reversing platform, mechanism for moving a record from said turn table to said platform, mechanism adapted to lower said platform and to reverse the same to place the record on the said conveyor in reversed relation, and end members spaced apart from said platform adapted to receive the record therebeneath in the tilting of said platform for maintaining the record on said platform in the lowering and reversing.

7. In a repeating phonograph having a storage magazine, a playing turn table and a conveyor adapted to return records to said storage magazine, the combination of a reversing platform, mechanism for moving a record from said turn table to said platform, mechanism adapted to lower said platform and to reverse the same to place the record on the said conveyor in reversed relation, and members positioned to allow the passage of the record thereover in its travel from the turn table to the said platform and to receive the record thereunder in the tilting of said platform for maintaining the record on the platform during the lowering and reversing.

8. In a repeating phonograph having a storage magazine, a playing turn table and a conveyor adapted to return records to said storage magazine, the combination of a reversing platform, mechanism for moving a record from said turn table to said platform, mechanism adapted to lower said platform and to reverse the same to place the record on the said conveyor in reversed relation, members spaced apart from said platform to receive the record therebeneath in its travel from the turn table to the said platform, and other members positioned to permit passage of the record thereover in the said travel and to receive the record thereunder in the tilting of said platform.

9. In a repeating phonograph the combination of a lowering and reversing platform, members for retaining a record thereon, substantially vertical guide members for said platform, mechanism for raising and lowering said platform, a member carried on said platform, and a member carried on one of said guide members and engaging said last-mentioned member to cause rotation of said platform in the raising and lowering thereof.

10. In a repeating phonograph the combination of a normally horizontal lowering and reversing platform upon which a record is deposited, members for retaining a record thereon, substantially vertical guide members for said platform, mechanism for raising and lowering said platform, a pinion carried on said platform, and a rack carried on one of said guide members and meshing with said pinion whereby raising and lowering of said platform causes rotation thereof.

11. In a repeating phonograph the combination of a lowering and reversing platform, members for retaining a record thereon, substantially vertical guide members for said platform, mechanism for raising and lowering said platform, a pinion carried on said platform, a rack carried by one of said guide members and meshing with said pinion during a part of said raising and lowering to cause rotation of said platform, and a block carried on said platform and engaging a portion of one of said guide members during another portion of said raising and lowering to prevent rotation of said platform.

12. In a repeating phonograph the combination of a platform, members for retaining a record on said platform, substantially vertical guide members for said platform, mechanism for raising and lowering said platform, a pinion carried on said platform, a rack carried on one of said guide members and meshing with said pinion during a part of said raising and lowering, and a pair of members carried respectively on said platform and on one of said guide members and adapted to engage with each other to position said pinion and said rack for initial engagement.

13. In a repeating phonograph having a supporting frame work, the combination of a lowering and reversing platform, members for retaining a record thereon, a power element, a shaft rotatable by said power element, a lever pivotally mounted on said frame work, a cam mounted on said shaft, a cam follower on said lever engaging said cam, and a mechanism connecting said lever with said platform whereby rotation of said shaft causes raising and lowering of said platform.

14. In a repeating phonograph having a supporting frame, the combination of a lowering and reversing platform, members adapted to retain a record on said platform, other members adapted to rotate said platform in the lowering thereof, a power element, a shaft rotatable by said power element, a cam carried on said shaft, a lever rotatably supported on said frame, a cam follower carried on said lever and engaging said cam and connecting means between said lever and said platform whereby rotation of said shaft causes alternate raising and lowering of said platform.

15. In a repeating phonograph having a supporting frame, the combination of a lowering and reversing platform, members adapted to maintain a record thereon during said lowering and reversing, a power element, a shaft rotatable by said power element, a cam carried on said shaft, a lever rotatably mounted on said frame, a cam follower carried on said lever and engaging said cam, a second lever rotatably mounted on said frame adjustably engaging said first-mentioned lever, and connecting means between said second-mentioned lever and said platform whereby rotation of said shaft causes raising and lowering of said platform, and adjustment of said adjustable engagement determines the range of movement of said platform.

16. In a repeating phonograph the combination of a supporting frame, a lowering and reversing platform, members adapted to maintain a record thereon during said lowering and reversing, a power element, a shaft rotatable by said power element, a cam carried on said shaft, a lever rotatably mounted on said frame, a cam follower carried on said lever and engaging said cam, a second lever rotatably carried on said frame concentric with said first-mentioned lever and having gravity engagement therewith, connecting means between said second-mentioned lever and said platform, and a support for said platform at the lowermost limit of its travel whereby rotation of said shaft causes lowering of said platform to said support and thereafter causes breaking of said gravity engagement.

17. In a repeating phonograph the combination of a supporting frame, a lowering and reversing platform, members adapted to maintain a record thereon during said lowering and reversing, a power element, a shaft rotatable by said power element, a cam carried on said shaft, a lever rotatably mounted on said frame, a cam follower carried on said lever and engaging said cam, a second lever rotatably mounted on said frame and having adjustable gravitational engagement with said first-mentioned lever, connecting means between said second-mentioned lever and said platform, and a support for said platform at the lowermost limit of its travel whereby rotation of said shaft causes raising and lowering of said platform, the upper limit of said motion being determined by the adjustment of said adjustable gravitational engagement and the lower limit of said travel is determined by the position of said support.

18. In a repeating phonograph having a storage magazine and a playing turn table the combination of a lowering platform having a longitudinal opening therein, mechanism for moving a record from said turn table to said platform, a record return conveyor having one end positioned beneath said platform and the opposite end positioned adjacent to said storage magazine, mechanism for lowering said platform to bring a record carried thereon adjacent to said conveyor, and an attachment on said conveyor adapted to extend through the longitudinal opening in said platform and by the movement thereof to remove the record from said platform and return the same to the storage magazine.

19. In a repeating phonograph having a storage magazine and a playing turn table the combination of a lowering and reversing platform having a longitudinal opening therein, mechanism for moving a record from said turn table to said platform, a record return conveyor having one end positioned beneath said platform and the opposite end positioned adjacent to said storage magazine, mechanism for lowering said platform and reversing the same to place the record carried thereon adjacent to said conveyor, members adapted to retain the record on said platform during the said lowering and reversing, and an attachment carried on said return conveyor and adapted to extend through the longitudinal opening in said platform to remove the record therefrom and return the same to the storage magazine.

20. In a repeating phonograph having a storage magazine and a playing turn table, the combination of a lowering platform, mechanism for moving a record from said turn table to said platform, a record return platform having one end positioned beneath said lowering platform and the opposite end positioned adjacent to said storage magazine and having a longitudinal opening therein, mechanism for lowering said first-mentioned platform and to place the record carried thereon adjacent to said second-mentioned platform, a conveyor chain positioned beneath said second-mentioned platform, and an attachment on said chain positioned to extend through said longitudinal opening, and by the movement thereof to return said record to the storage magazine.

21. In a repeating phonograph having a storage magazine and a playing turn table, the combination of a lowering and reversing platform, mechanism for moving a record from said turn table to said platform, a record return platform having one end positioned beneath said first-mentioned platform and the opposite end positioned adjacent to said storage magazine and having a longitudinal opening therein, mechanism for lowering said first-mentioned platform and reversing the same to place the record carried thereon upon said second-mentioned platform in reversed relation, members adapted to retain the record on said first-mentioned platform during the said lowering and reversing, a conveyor chain positioned beneath said second-mentioned platform, and an attachment on said chain positioned to extend through the longitudinal opening in said platform and by movement thereof to return said record to the storage magazine.

22. In a repeating phonograph having a storage magazine and a playing turn table, the combination of a lowering and reversing platform having a longitudinal opening therein, mechanism for moving a record from said turn table to said platform, a record return platform having one end positioned beneath said first-mentioned platform and the opposite end positioned adjacent to said storage magazine and having a longitudinal opening therein, mechanism for lowering said first-mentioned platform and reversing the same to place the record carried thereon upon said second-mentioned platform in reversed relation, members adapted to retain the record on said first-mentioned platform during the said lowering and reversing, a conveyor chain positioned beneath said second-mentioned platform, and an attachment on said chain positioned to extend through the longitudinal openings in both platforms and by the movement thereof to return said record to the storage magazine.

23. In a repeating phonograph the combination of a supporting frame, a storage magazine, a record transfer platform upon which a record is deposited for returning to said magazine, a power element, a shaft rotated by said power element, a lever pivotally mounted on said frame, connecting means between said platform and said lever, and a member carried upon said shaft and engaging said lever whereby rotation of said shaft causes alternate raising and lowering of said platform.

24. In a repeating phonograph having a supporting frame, the combination of a storage magazine, a record transfer platform for returning records thereto, a power element, a shaft rotated by said power element, a lever pivotally mounted on said frame and having a substantially semi-circular portion, connecting means between said platform and said lever, and a member carried upon said shaft and engaging said semi-circular portion, whereby rotation of said shaft causes alternate raising and lowering of said platform.

25. In a repeating phonograph having a supporting frame the combination of a storage magazine, a record transfer platform for returning records thereto, a power element, a shaft rotated by said power element, a lever pivotally mounted on said frame, a gravity connection between said platform and said lever, a support for said platform, and a member carried upon said shaft and engaging said lever, whereby rotation of said lever causes alternate raising of the platform from said support and lowering of the platform to said support.

26. In a repeating phonograph the combination of a supporting frame, a storage magazine, a record transfer platform for returning records thereto, a power element, a shaft rotated by said power element, a stem supporting said platform, a lever pivotally mounted on said frame and having a yoke portion adapted to straddle the said stem, projecting members on said stem adapted to rest on said yoke portion, and a member carried upon said shaft and engaging said lever whereby rotation of said shaft causes alternate raising and lowering of said platform.

27. In a repeating phonograph the combination of a supporting frame, a storage magazine, a record transfer platform for returning records thereto, a power element, a shaft rotated by said power element, a lever pivotally mounted on said frame, connecting means between said platform and said lever, and a member carried upon said shaft and engaging said lever during a portion of the rotation of said shaft, said lever being supported upon said shaft during the remainder of said rotation.

28. In a repeating phonograph having a supporting frame, the combination of a storage magazine, a record transfer platform for returning records thereto, a power element, a shaft rotated by said power element, a lever pivotally mounted on said frame and having a substantially semi-circular portion, connecting means between said platform and said lever, a member carried upon said shaft, and a plurality of rollers carried upon said last-mentioned member and engaging the said semi-circular portion, whereby rotation of said shaft causes alternate raising and lowering of said platform.

29. In a repeating phonograph the combination of a platform adapted to support a plurality of disc records in superposed relation, mechanism for lowering and raising said platform, members adapted to support said records during said lowering and raising, mechanism for placing a record on said platform when lowered, a stem associated with said platform, mechanism for positioning said supporting members for supporting the records and for removing the same from said supporting position, and adjustable members carried on said stem and controlling said positioning mechanism.

30. In a repeating phonograph the combination of a supporting frame, a platform adapted to support a plurality of disc records in superposed relation, mechanism for lowering and raising said platform, a plurality of substantially vertical members, supporting ledges carried on said vertical members and adapted to be positioned by movement of said vertical members to support the said records during the lowering and raising of the platform, mechanism for placing a record on said platform when lowered, a pivotal connection between said vertical members and said frame, yielding means normally maintaining said supporting ledges in record-supporting position, and mechanism operable by the raising of said platform to remove said ledges from record-supporting position as said platform approaches the upper limit of its travel.

31. In a repeating phonograph the combination of a supporting frame, a platform adapted to support a plurality of disc records in superposed relation, mechanism for lowering and raising said platform, a plurality of substantially vertical members, supporting ledges carried on said vertical members and adapted to be positioned by movement of said vertical members to support the said records during the lowering and raising of the platform, mechanism for placing a record on said platform when lowered, a pivotal connection between said vertical members and said frame, yielding means normally maintaining said supporting ledges in record-supporting position, and bell cranks pivotally mounted on said supporting frame and engaging said vertical members and operable by the raising of said platform to remove said ledges from record-supporting position as said platform approaches the upper limit of its travel.

32. In a repeating phonograph the combination of a supporting frame, a platform adapted to support a plurality of disc records in superposed relation, mechanism for lowering and raising said platform, a plurality of substantially vertical members, supporting ledges carried on said vertical members and adapted to be positioned by movement of said vertical members to support the said records during the lowering and raising of the platform, mechanism for placing a record on said platform when lowered, a pivotal connection between said vertical members and said frame, yielding means normally maintaining said supporting ledges in record-supporting position, bell cranks pivotally supported on said frame work and engaging said vertical members, a substantially vertical stem associated with said platform and movable therewith, adjustable members carried on said stem, and an operating connection between said adjustable members and said bell cranks at the upper end of the travel of said platform whereby said ledges are removed from record-supporting position.

33. In a repeating phonograph the combination of a supporting frame, a platform adapted to support a plurality of disc records in superposed relation, mechanism for lowering and raising said platform, a plurality of substantially vertical members, supporting ledges carried on said vertical members and adapted to be positioned by movement of said vertical members to support the said records during the lowering and raising of the platform, mechanism for placing a record on said platform when lowered, a pivotal connection between said vertical members and said frame, yielding means normally maintaining said supporting ledges in record-supporting position, bell cranks pivotally supported on said frame work and engaging said vertical members, a substantially vertical stem associated with said platform and movable therewith, adjustable members carried on said stem, and pins slidably supported upon said frame work contacting with said bell crank and contacting with said adjusting means at the upper limit of travel of said platform to remove said ledges from record-supporting position.

34. In a repeating phonograph having a playing turn table and a storage magazine, the combination of members adapted to move a record from said storage magazine to said turn table and from said turn table back to said magazine, a power element adapted to actuate said members for moving said records and for returning said members to initial position, an electric switch element operable by the completion of playing of a record to actuate said power means, a second electric switch element adapted to stop said actuation when said record-moving members have returned to initial position, a third switch element adapted to stop said actuation when said members have reached a predetermined point in their return when said second switch element is out of circuit, and a fourth switch element adapted to selectively place said second switch element in and out of circuit.

35. In a repeating phonograph having a turn table, a storage magazine and a tone arm adapted to engage a record on said turn table and to be moved by the grooves therein, the combination of members adapted to move a record from said storage magazine to said turn table and from said turn table back to said magazine, a power element adapted to actuate said members for moving said records and for returning said members to initial position, an electric switch element operable by the movement of said tone arm at the completion of playing of a record to actuate said power means, and a second electric switch element adapted automatically to stop said actuation at a predetermined point in the return of said record-moving members.

36. In a repeating phonograph having a turn table, a storage magazine and a tone arm adapted to engage a record on said turn table and to be moved by the grooves therein, the combination of members adapted to move a record from said storage magazine to said turn table and from said turn table back to said magazine, a power element adapted to actuate said members for moving said records and for returning said members to initial position, an electric switch element operable by the movement of said tone arm at the completion of playing of a record to actuate said power means, a second electric switch element adapted to stop said actuation when said record-moving members have returned to initial position, a third switch element adapted to stop said actuation when said members have reached a predetermined point in their return when said second switch element is out of circuit, and a fourth switch element connected to selectively place the second switch element in and out of circuit.

37. In a repeating photograph having a turn table, a storage magazine and a tone arm adapted to engage a record on said turn table and to be moved by the grooves therein, the combination of members adapted to move a record from said storage magazine to said turn table and from said turn table back to said magazine, a power element adapted to actuate said members for moving said records and for returning said members to initial position, an electric switch element operable by the movement of said tone arm at the completion of playing of a record to actuate said power means, a second electric switch element adapted to stop said actuation when said record-moving members have returned to initial position, a third switch element adapted to stop said actuation when said members have reached a predetermined point in their return, and a fourth switch element connected to selectively place in circuit the two last-mentioned switch elements.

38. In a repeating phonograph adapted to use records having a braking groove, the combination of a turn table, a storage magazine, a tone arm having an operating portion adapted to engage a record on said turn table, and to be moved by the grooves in said record, operating mechanism for moving records from the storage magazine to the turn table and from the turn table to the storage magazine and for returning the tone arm to initial playing position, a power element for actuating said operating mechanism, an electric switch operable by the movement of said tone arm to open its circuit when said tone arm is returned to its initial playing position and to close its circuit when the operating portion of said tone arm engages the braking grooves of the record, a master switch movable by said power element in timed relation with said operating mechanism and having an electrical contact therein in parallel connection with said first-mentioned switch, said contact being adapted to close its circuit after the closing of the first-mentioned switch and to break its circuit at a predetermined time after the return of said tone arm to the initial playing position, and electrical connections between said switches and said power element, whereby the making of the contact in the first-mentioned switch energizes said power element to actuate said operating mechanism and the breaking of the circuit of said master switch contact stops said energization.

39. In a repeating phonograph having a storage magazine, a playing turn table and a lowering and reversing platform, the combination of mechanism for moving a record from said storage magazine to said turn table and from said turn table to said reversing and lowering platform, other mechanism for operating said platform, a power element, a sprocket chain driven by said power element and transmitting power to said mechanisms, and an attachment on said sprocket chain adapted to remove a record from said lowering and reversing platform and move said record to said storage magazine.

40. In a repeating phonograph having a storage magazine, a playing turn table, a lowering and reversing platform and an elevator for said storage magazine, the combination of mechanism for moving a record from said storage magazine to said turn table and from said turn table to said reversing and lowering platform, mechanism for operating said platform, mechanism for operating said elevator, a power element, a sprocket chain driven by said power element and transmitting power to said mechanisms, and an attachment on said sprocket chain adapted to remove a record from said lowering and reversing platform and move said record to said elevator.

41. In a repeating phonograph having a frame, a playing turn table and a tone arm mounted on said frame said tone arm having its operating portion adapted for oscillation about a horizontal axis, the combination of a lever, a centering pin carried on said lever and adapted to engage the central hole in a disc record positioned on said turn table, a portion of said lever adapted to support said operating portion of the tone arm, a forked portion of said lever adapted to straddle the supporting portion of said tone arm, a pivotal mounting for said forked portion supported upon said frame and mechanism for raising and lowering said lever about said pivotal mounting for bringing said centering pin into engagement with the said hole and for bringing the operating portion of said tone arm into engagement with the record.

42. In a repeating phonograph having a frame, a playing turn table and a tone arm mounted on said frame for oscillation about a vertical axis, said tone arm having an operating portion adapted for oscillation about a horizontal axis, the combination of a lever, a centering pin carried on said lever and adapted to engage the central hole in a disc record positioned on said turn table, a portion of said lever being adapted to support the operating portion of the tone arm, a pivotal mounting for said lever on said frame positioned adjacent to the mounting of said tone arm on the side of said mounting farthest from said turn table, and mechanism for raising and lowering said lever about said pivotal mounting for bringing said centering pin into engagement with the said hole and for bringing the operating portion of the tone arm into engagement with the record.

43. A repeating phonograph including a horizontal turntable for receiving a phonograph record, a normally horizontal reversing platform spaced to one side thereof, means for transferring a record horizontally from the turntable to said platform, and means for reversing said platform whereby said record will be reversed with its bottom side up.

44. A repeating phonograph including a horizontal turntable for receiving a phonograph record, a normally horizontal reversing platform spaced to one side thereof, means for transferring a record horizontally from the turntable to said platform, means for reversing said platform whereby said record will be reversed with its bottom side up, and means for transferring said record back to the turntable in its reversed position.

45. A repeating phonograph including a horizontal turntable for receiving a phonograph record, a reversing platform spaced to one side thereof, means for removing a record horizontally from the turntable and depositing it upon said platform, and means for reversing said platform whereby said record will be reversed with its bottom side up.

46. A repeating phonograph including a horizontal turntable for receiving a phonograph record, a record supporting and reversing member pivotally mounted at one side of said turntable and spaced therefrom and normally lying in substantially the same plane therewith, means for transferring a record horizontally from the turntable and sliding it into position upon said member, and means for turning said member about its pivotal mounting for reversing said record to present its bottom side up.

In witness whereof, I have hereunto affixed my signature.

THOMAS W. SMALL.